H. RICHARDSON.
AUTOMATIC WEIGHING MACHINE.
APPLICATION FILED NOV. 16, 1908.

960,108.

Patented May 31, 1910.
2 SHEETS—SHEET 1.

Witnesses.
Robert Everitt.

Inventor,
Henry Richardson.
By James L. Norris
Atty.

H. RICHARDSON.
AUTOMATIC WEIGHING MACHINE.
APPLICATION FILED NOV. 16, 1908.
960,108.
Patented May 31, 1910.
2 SHEETS—SHEET 2.
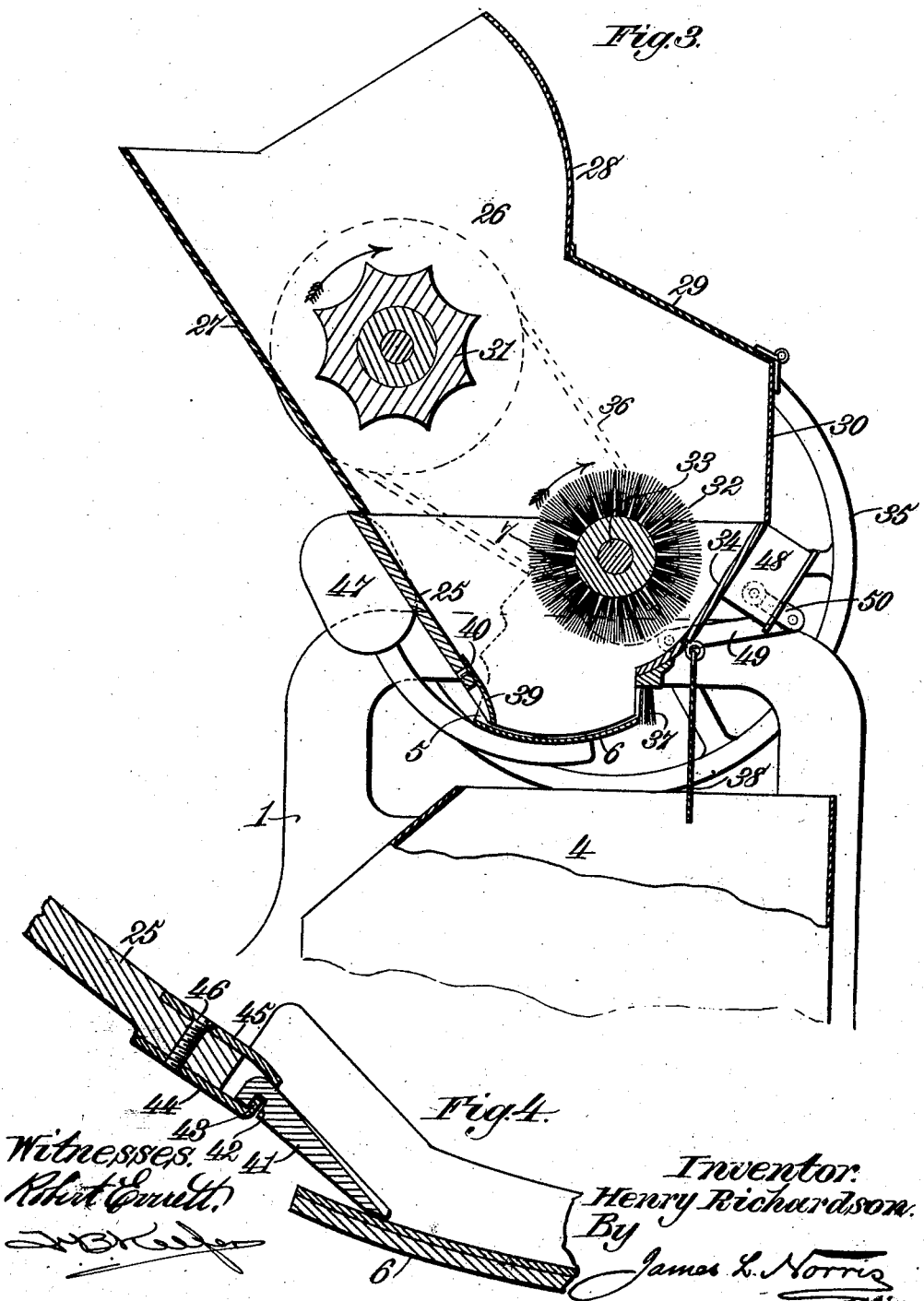

UNITED STATES PATENT OFFICE.

HENRY RICHARDSON, OF NEW YORK, N. Y.

AUTOMATIC WEIGHING-MACHINE.

960,108.

Specification of Letters Patent.   Patented May 31, 1910.

Application filed November 16, 1908.   Serial No. 462,862.

*To all whom it may concern:*

Be it known that I, HENRY RICHARDSON, a subject of the King of Great Britain, residing at New York, in the county of New York and State of New York, have invented certain new and useful Improvements in Automatic Weighing-Machines, of which the following is a specification.

My present invention relates to improvements in automatic weighing machines and more especially to the mechanism for feeding the material to the weigh hopper, and it has for its object primarily to provide a feed mechanism of this character which is capable of handling cotton seed and other material which flows sluggishly, the present invention providing such a mechanism which has means for feeding the material through the hopper and to the cut-off or controlling gate whereby clogging of the material is prevented, also means such as a scraper for preventing such material as may adhere to the gate from passing into the space between the gate and the rear edge of the feed hopper, and also to provide a brush to coöperate with the discharge edge of the gate when the latter is closed.

To these and other ends, the invention consists in certain improvements, and combinations and arrangements of parts, all as will be hereinafter more fully described, the novel features being pointed out particularly in the claims at the end of the specification.

Figure 1:
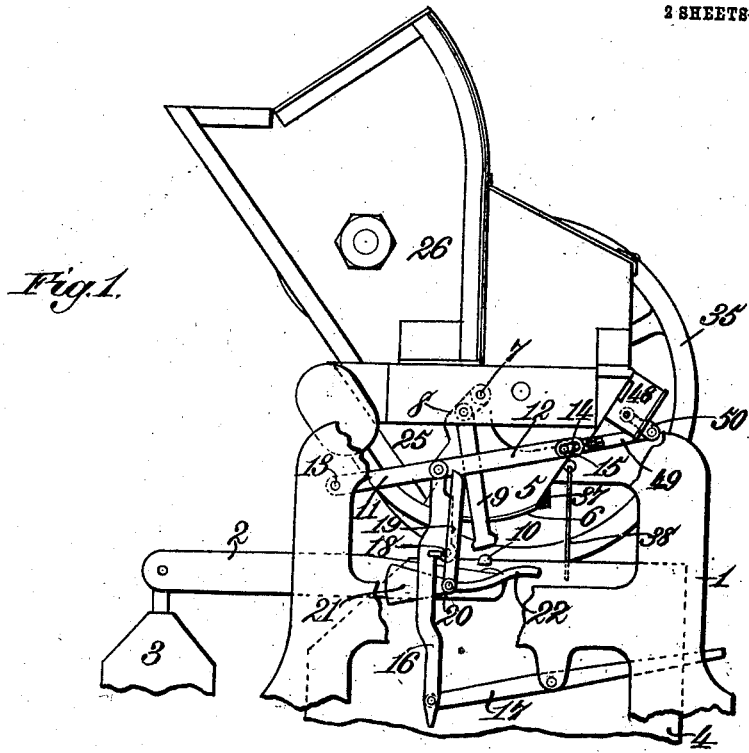
Figure 2:
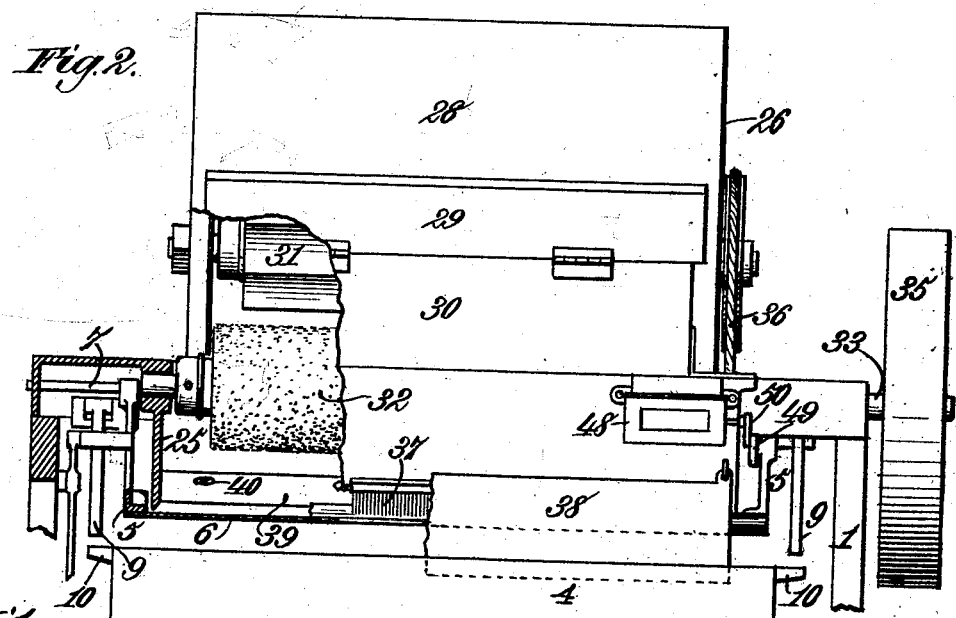

In the accompanying drawing:—Figure 1 represents a side elevation of the upper portion of a weighing machine equipped with feed mechanism constructed in accordance with my present invention; Fig. 2 represents a front elevation of that portion of the machine shown in Fig. 1, parts of the machine being broken away and shown in section; Fig. 3 represents a vertical section through the feeding mechanism; and Fig. 4 is a detail sectional view of a different form of scraper which may be used instead of that shown in Fig. 3.

Similar parts are designated by the same reference characters in the several views.

My present invention provides feed mechanism for weighing machines whereby the latter may be adapted for use in the handling of materials which flow sluggishly and have a tendency to adhere more or less to the hopper and gate and, in the accompanying drawing, I have shown a feed mechanism of this character which is especially adapted for use in the handling of cotton seed. It will be understood, however, that I have shown one particular embodiment only of the invention, and that certain changes in the construction and relative arrangement of the parts may be made in adapting the invention to different uses.

The feed mechanism embodying my present invention may be applied to weighing machines of various types and, in the present instance, I have shown it in connection with weighing machines of the character covered by my prior patents, Nos. 760,485 and 786,152. As the general construction of machines of this type is fully disclosed in said prior patents, it will be only necessary to describe briefly the controlling and operating mechanism for the feed gate. The frame 1 supports the weigh beam 2 which has a counterweight 3 attached to one end and its opposite end supports the weigh hopper 4. The feed gate 5 has a segmental bottom 6 which is concentric with the axis 7 by means of which the gate is pivoted on the frame, and the gate is provided preferably at each side with means for opening and closing it and for automatically controlling such movements according to the position occupied by the weigh beams, a crank 8 being attached at each side of the gate from which hangs a pendant 9 the lower end of which is adapted to be engaged by a projection 10 upon the weigh hopper as the latter rises after discharging its load, such rising movement of the weigh hopper causing the projection thereon to strike the pendant, and the latter operating through the crank 8 will turn the gate into open position. A pair of toggle links 11 and 12 are provided for locking the gate in closed position, the link 11 being pivotally attached at 13 to the frame and the link 12 is provided with an elongated eye 14 which coöperates with a pin 15 carried by the gate. A drop bar 16 is suspended from the intermediate pivot of the toggle links and is pivotally attached at its lower end to an operating lever 17, the latter being controlled by the movements of the weigh hopper. This drop bar is provided with a roller or projection 18 which is adapted to be engaged by a trigger 19 preliminarily to the closing of the feed gate, this trigger being mounted upon the frame by means of a pivot 20 and has a weight 21 arranged at one side of the pivot and a cam-shaped operating arm 22 arranged at the opposite side of said pivot, this operating arm being arranged to be depressed as the weigh hopper settles down after receiving a full load, the trigger being thereby disengaged from the roller or projection 18 upon the drop bar and thereby permitting a complete closing of the feed gate.

The mechanism just described has, in practice, proven satisfactory for the purpose of controlling the movements of the feed gate. It will be understood, however, that the present invention is not limited to a mechanism of this specific construction, as other mechanism capable of properly operating the feed gate may be used.

The feed mechanism which embodies the subject matter of my present invention is used in connection with a feed hopper 25 which is preferably mounted upon the top of the machine frame, it having an opening in its lower portion through which the material may discharge into the weigh hopper which opening is controlled by the feed gate. Above this hopper is mounted a housing 26 one wall 27 of which is preferably inclined and forms substantially a continuation of the adjacent wall of the feed hopper, and the opposite wall of the housing has a curved wall 28, an inclined lid 29 and a vertical wall 30, the latter extending downwardly to the feed hopper. Mounted within the housing is a primary feeding device which in the present instance consists of a roll 31 the periphery of which is fluted or channeled so as to form pockets or recesses whereby this roll may obtain a hold upon the material which is fed into the top of the housing. This roll is mounted preferably in close proximity to the inclined wall 27 of the housing and, in rotating in the direction indicated by the arrow, serves to carry the material toward the right in Fig. 3 and under the lid 29, the material being thereby fed to a secondary feeding device which in the present instance consists of a revoluble brush 32 which is preferably in the form of a cylinder having bristles of appropriate stiffness projecting radially therefrom. This revoluble brush is preferably mounted in proximity to the feed gate, it having in the present instance a shaft 33 which is journaled in the feed hopper and the periphery of the brush is spaced a suitable distance from the adjacent wall 34 of the feed hopper thereby forming a relatively narrow passage through which the material may pass to the feed gate. The fluted roll and brush may be revolved in any suitable manner, the shaft of the brush being provided in the present instance with a pulley or other power transmitting device 35, and this brush is driven in unison with the fluted roll by means of a sprocket chain 36 which passes over sprocket wheels connected, respectively, to the brush and roll, the gearing being preferably such that the roll will revolve at a lower speed as compared to the speed of rotation of the brush.

The edge of the feed hopper with which an edge of the gate coöperates when the latter is closed is preferably provided with a brush 37 which brush preferably projects downwardly from the feed hopper and is arranged to be engaged at one side by the corresponding edge of the feed gate when the latter is closed whereby the flow of material from the feed hopper into the weigh hopper is interrupted. A deflector plate 38 is preferably hung in proximity to this brush 37 whereby spilling of the material in flowing from the feed hopper into the weigh hopper is prevented.

In order to prevent such material as may adhere to the upper side of the feed gate from entering the clearance space formed between the latter and the feed hopper, a scraper is provided and this scraper may be of different forms. In Fig. 3 the scraper embodies a plate 39 which is rigidly attached to the rear wall of the feed hopper by means of the screws 40, the lower edge of this plate being relatively sharp and is arranged to bear upon or rest in immediate proximity to the upper surface of the feed gate so that as the latter swings into open position such material as may adhere to its upper surface will be removed therefrom and thus prevented from catching between the gate and the hopper. In some instances, it may be preferable to employ a scraper such as that shown in Fig. 4, the scraper in this instance comprising a plate 41 the lower edge of which is adapted to coöperate with the upper surface of the feed gate and its upper portion is provided on its under side with a longitudinal groove 42 with which an upturned flange 43 upon a plate 44 coöperates. A spring-plate 45 is arranged to bear upon the upper side of the plate 41 and it serves to yieldingly retain the plate in coöperative relation with the feed gate, although the plate is capable of a pivotal movement upon the flange 43. The plates 44 and 45 are arranged at the upper and lower sides of the rear wall of the feed hopper and may be secured in position by means of suitable screws or bolts 46. In order to facilitate the closing of the gate, a weight 47 is preferably attached thereto at the rear side of the pivotal center 7 of the gate. A register 48 may also be provided, the register being attached to the gate by means of a link 49 and crank 50.

The material to be weighed is fed in any suitable manner into the top of the housing, and the pulley 35 is revolved continuously by a belt or other appropriate means. The material entering the housing first encounters the fluted roll which revolves in the direction indicated by the arrow in Fig. 3, and the grooves or channels formed axially in the periphery of this roll cause the material to be carried under the lid 29 and over the revoluble brush 32. This brush acting upon the material causes the same to pass through the space between it and the wall 34 of the feed hopper and onto the feed gate. The latter will stand in an open position when the weigh hopper is empty, and the material is then free to discharge from the feed hopper into the weigh hopper. When the latter has received approximately a full load, it will settle downwardly, causing a corresponding movement of the drop bar 16 which, acting upon the toggle links will cause the gate to be partially closed, the drop bar being intercepted in its downward movement by the trigger 19 which engages the roller or projection 18 on the drop bar. A small quantity of the material continues to discharge through the gate until the weigh hopper has received a full charge. While a reduced quantity of the material is flowing into the weigh hopper through the small opening in the feed gate, the revolving motion of the brush serves to advance the material to the gate evenly so that clogging or other unevenness in the feed is prevented. When the weigh hopper is fully loaded it will descend farther, causing the trigger to release the drop bar and the latter in turn will unlock the toggle links and thus permit the gate to fully close under the influence of the weight 47. After the hopper has discharged its load, it will rise, the drop bar rising and unlocking the toggle links, and the projection 10 upon the weigh hopper will strike the pendant which in turn will swing the gate into open position whereby the weigh hopper may receive another charge of material.

Feeding mechanism constructed in accordance with my present invention provides means for uniformly feeding cotton seed and other material which is lumpy and sluggish in its movements and has a tendency to clog, the mechanism being simple and inexpensive in its construction and it may be applied with facility to weighing machines of various types. By providing a scraper for removing such material as may adhere to the upper surface of the feed gate, sticking of the latter owing to the accumulation of material between it and the adjacent edge of the hopper is prevented, and by providing the brush to coöperate with the gate when the latter is fully closed, the flow of the material into the weigh hopper may be interrupted in such manner as to prevent any leakage of the material past the gate when closed, and there is no liability of the gate catching while in its closed position.

I claim as my invention:—

1. Feed mechanism for weighing machines comprising a hopper having a discharge gate in its bottom, and a revoluble feeding device mounted in the hopper above said gate, one wall of the hopper being curved substantially about the axis of the feeding device and leading to said gate, a curved feed passage being thereby formed between the hopper and the feeding device.

2. Feed mechanism for weighing machines comprising a hopper having a discharge gate in its bottom, and a cylindrical brush feeder mounted in the hopper, one wall of the hopper being curved at a level below the axis of the brush to conform substantially to the curvature thereof and having its end terminating at a point to direct the material in a transverse direction across the top of the gate.

3. Feed mechanism for weighing machines comprising a hopper having a depressed discharge gate in its bottom, and a revoluble feeding device mounted in the hopper above said gate, the front wall of the hopper being curved to conform approximately to the curvature of the feeding device and the rear wall of the hopper sloping toward the gate in a reverse direction, the curved front wall of the hopper forming a discharge for the material at a point above the gate and being positioned to direct the material against the rear wall of the hopper.

4. Feed mechanism for weighing machines comprising a feed hopper, a gate controlling the discharge of material therefrom, and primary and secondary feeding devices mounted on parallel axes within the hopper, the secondary feeding device being arranged adjacent to the gate, and means for driving the secondary feeding device at a greater speed relatively to the speed of the primary feeding device.

5. Feed mechanism for weighing machines comprising a feed hopper, a gate controlling the discharge of material therefrom and having front and rear walls sloping toward said gate, a primary feeding device arranged adjacent to the rear wall of the hopper and a secondary feeding device arranged in immediate proximity to the front wall of the hopper, the latter being curved so as to direct the material in an approximately horizontal plane as it approaches the gate.

6. Feed mechanism for weighing machines comprising a feed hopper, a gate controlling the discharge of material therefrom, a fluted roll located toward the receiving opening in the hopper and arranged at one side of the gate, and a revoluble brush located adjacent to the feed gate and toward the opposite side of the same for promoting the flow of material thereto.

7. In weighing machines, the combination of a feed hopper, a gate controlling the discharge of material therefrom, a brush arranged to engage at one of its sides with an edge of the gate when the latter is closed whereby the flow of material from the hopper may be interrupted and a deflector plate arranged adjacent to and depending below said brush.

8. In a weighing machine, the combination of a feed hopper, a gate for controlling the discharge of material therefrom, and a scraper having a yieldably supported but rigid edge which forms a closure between the gate and one wall of the hopper, said scraper being coöperative with the gate to remove material adhering to the upper surface thereof during its opening movement.

9. Feed mechanism for weighing machines comprising a feed hopper having an opening for the discharge of material, a reciprocatory feed gate mounted to cover and uncover said opening, and a scraper having a substantially rigid edge which is yieldably supported upon one edge of the opening in the hopper to form a closure between the hopper and the feed gate, said edge being inclined with respect to the gate and coöperative with its upper surface to remove material adhering thereto during the opening movement of the gate.

10. Feed mechanism for weighing machines comprising a feed hopper, a gate pivotally mounted relatively thereto and having a segmental bottom, and a scraper mounted yieldably on the hopper and having an edge forming a closure between the gate and one wall of the hopper and arranged to coöperate with the upper surface of said gate to remove material adhering thereto during its opening movement.

In testimony whereof I have hereunto set my hand in presence of two subscribing witnesses.

HENRY RICHARDSON.

Witnesses:
ROBERT S. SIEGEL,
NELLIE M. ETTWEIN.